June 11, 1935. C. W. HOWE ET AL 2,004,530
APPARATUS AND METHOD FOR FORMING EDIBLE RECEPTACLES
Filed June 21, 1933
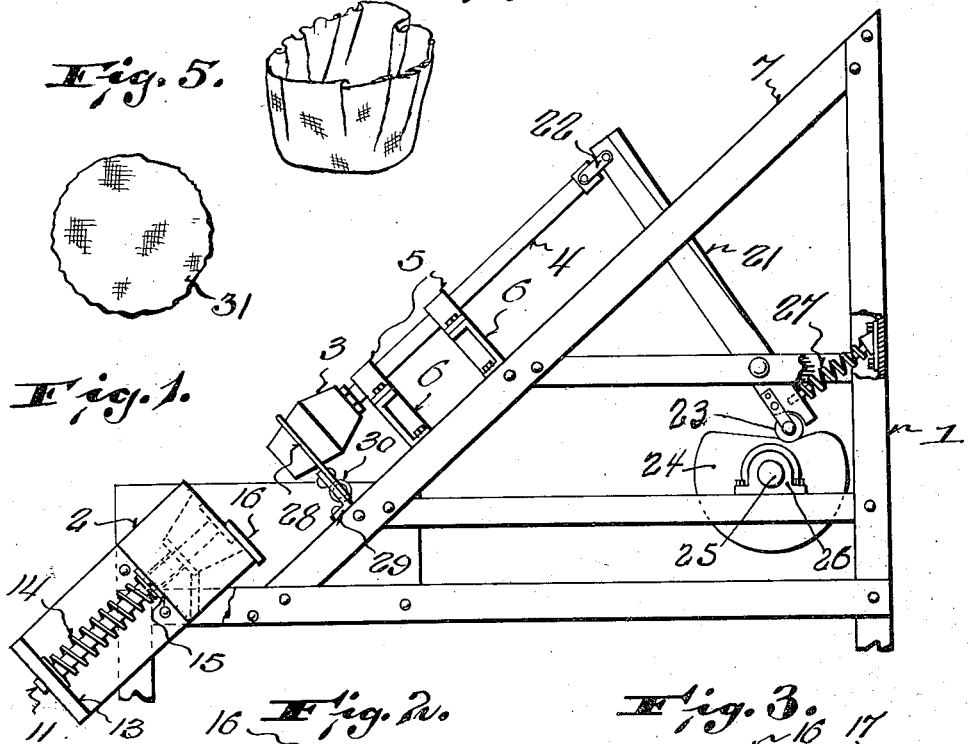
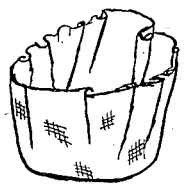
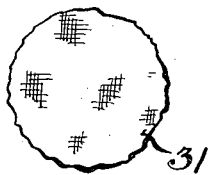
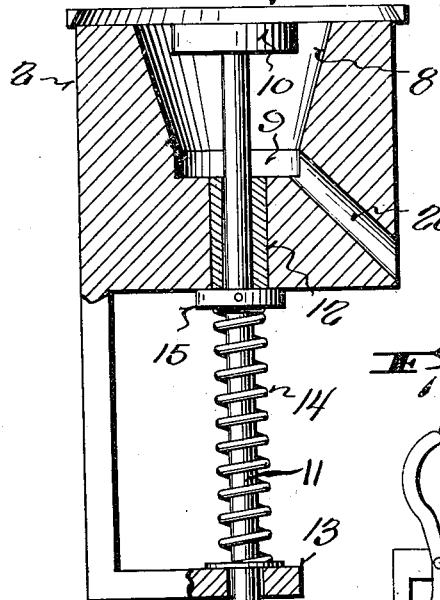
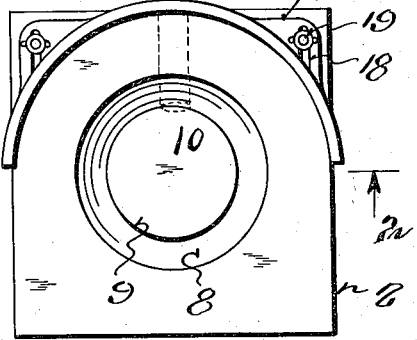
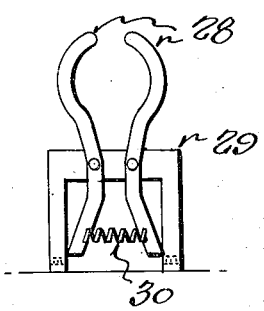
Inventors
C. W. Howe
And J. A. Nevin
By
Attorneys Patented June 11, 1935

2,004,530

UNITED STATES PATENT OFFICE 2,004,530

APPARATUS AND METHOD FOR FORMING EDIBLE RECEPTACLES

Charles W. Howe, Milwaukee, Wis., and John A. Nevin, Wichita, Kans.; said Howe assignor to said Nevin Application June 21, 1933, Serial No. 676,848

4 Claims. (Cl. 107—15)

This invention pertains to an apparatus and method of forming edible receptacles for various food products, such as ice cream, confections, salads, and the like.

Heretofore it has been common practise, in forming edible receptacles, to either shape the dough to a mould and cooking the same thereon, or to cast the same in a mould, forming the desired shape by means of a plunger, and thereafter cooking the product while in the mould.

The first method is cumbersome and expensive, and while the second method is satisfactory for receptacles, such as ice cream cones made from a light batter, which does not contain an appreciable amount of sugar or other sticky ingredients, the same cannot be used in connection with a sugar batter, due to the fact that a batter of this character will adhere to the moulds.

It is therefore the primary object of the present invention to provide an exceedingly simple and inexpensive apparatus for forming edible receptacles from a highly nutritious and palatable batter containing sugar and other sticky ingredients, heretofore presenting serious difficulties.

Incidental to the foregoing, a more specific object of the invention resides in the provision of an apparatus consisting of a male and female die, by means of which a flat, cooked waffle, or blank, is formed into a receptacle for the reception of ice cream, or other foods.

A further object resides in the novel, improved method of forming edible receptacles, consisting of first cooking a waffle, or blank, formed from batter, then shaping the waffle into a receptacle while the same is in warm, pliable condition, and thereafter permitting the same to cool to provide a substantially rigid and brittle edible container characterized by its high nutritious value and extreme palatability.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:—

Figure 1 is a fragmentary elevation of an apparatus constructed in accordance with one form of the present invention, parts being broken away and in section to more clearly illustrate the structural details.

Figure 2 is a detail vertical section through the female die.

Figure 3 is a plan view of the same.

Figure 4 is a detail of the strippers for removing the receptacle from the male die.

Figure 5 is a view of the waffle or blank from which the receptacle is formed, and Figure 6 is an elevation of the finished receptacle.

Referring now more particularly to the accompanying drawing, the numeral 1 designates a frame, which may be fabricated from angle iron, or any other suitable material, in any desired shape, for the support of a female die 2 and a reciprocating male die 3, the latter being secured to the end of a plunger 4 slidably mounted within the journals 5, supported upon the brackets 6 secured to the incline upright 7 of the frame 1.

For the purpose of convenience, both the male and female dies are positioned upon an angle, as best shown in Figure 1, it being found that such arrangement facilitates feeding of the edible blanks to the female die, and subsequent discharge of the completed receptacle.

As best shown in Figure 2, the female die 2 is provided with a recess 8, so formed as to produce a receptacle of the desired contour. Obviously, the recess 8 may be of various depth and diameter to produce either a comparatively shallow container, or a deep narrow one, depending upon the purpose for which it is to be used.

As will be noted in Figure 2, the bottom of the recess 8 terminates in a straight well portion 9, for the reception of a plunger 10, mounted upon the stem 11, which is slidably journaled in a bushing 12 mounted in the bottom of the die 2. The lower end of the stem 12 is guided in a bracket 13 connected with the die 2, while a coil spring 14, mounted on the stem, and interposed between the bracket 13 and collar 15 secured to the stem, serves to normally urge the plunger 10 to its projected position, as shown in Figure 2.

Adjustably mounted upon the top of the die 2, adjacent its lower edge, is a semi-circular guard 16, which retains the waffle or blank upon the top of the die 2, prior to forming the same into a container by means of the plunger 4, the lower portion of which is tapered to conform to the shape of the recess 8. A further purpose of the guard 16 is to aline the waffle, or the blank, with relation to the recess 8. Therefore the flanges 17 are provided with slots 18 for reception of the threaded studs 19. The purpose of this attachment is to provide for the desired alinement of the waffle or blank with relation to the recess 8. In some instances it is desired to center the waffle with relation to the recess, while in other instances, when it is desired to provide an irregular edge on the container, wherein one side will be lower than the other, as illustrated in Figure 6, the guard 16 is shifted to offset the center of the blank with relation to that of the recess.

Inasmuch as the waffle or blank is cooked prior to forming the same within the recess of the mould 2, it has been found that during the forming operation there is a tendency for small particles and crumbs to break off of the waffle. Therefore, in order to eliminate such crumbs from the recess 8, the die block 2 is provided with a vertical opening 20, which communicates with the lower portion of the well 9, thus permitting discharge of any crumbs that accumulate in the recess 8.

While the die 3 may be reciprocated in various ways, without departing from the present invention, one form of mechanism has been illustrated comprising a rocking arm 21, pivotally connected to the frame 1, and having its outer end connected to the plunger 4 by suitable links 22, thus compensating for rocking movement of the arm and reciprocative action of the plunger 4.

The opposite end of the arm 21 is provided with a roller 23, which engages the periphery of a cam 24 mounted on the shaft 25 and journaled in the bearings 26, which are carried by one of the transverse stretches of the frame 1. A spring 27, interposed between the lower end of the arm 21 and the rear upright of the frame 1, serves to normally urge the roller 23 into engagement with the periphery of the cam 24. Obviously, as the cam is rotated, either manually or by power, oscillatory movement will be imparted to the arm 21, which in turn reciprocates the plunger 4, and the male die 3.

While it is not essential to the present invention, means have been provided for stripping the flanged containers from the male die 3, to which the containers adhere when the same is withdrawn from the female die 2. These strippers comprise a pair of pivotal arms 28 carried by the bracket 29 mounted on the frame 1. The outer end of the arms 28 are semi-circular in shape, and embrace the male die 3. As best shown in Figure 4, an expansile spring 30 is interposed between the rear ends of the arms 28, to urge the outer ends into engagement with the male die 3, and yet permit the same to pass therethrough.

As heretofore explained, it is proposed to form an edible container from a cooked waffle or blank 31, such as illustrated in Figure 5, and while this is shown as being circular in shape, it is to be understood that any shape, such as rectangular or triangular, may be provided without affecting the principles of the invention.

In practising the method included in the present invention, a batter of any desired ingredients, whether sticky or otherwise, is provided, and cooked to a certain degree in any conventional manner, and while the waffle is still hot and in a pliable condition, the same is positioned upon the top of the die block 2, and supported thereon by the guard 16. The plunger 4 is then forced downwardly by the cam mechanism, as heretofore explained, causing the male die 3 to enter the recess 8, thus shaping the flat waffle or blank 31 to the contour of the die, and, obviously, due to the folds which result, and a normally fluted edge, as shown in Figure 5, assuming the same is employed, the upper edge of the container, after being formed, will assume an irregular, fluted contour of highly attractive appearance, and simulating a hand-formed receptacle, rather than a machine constructed product, which is considerably more desirable to the purchaser.

As the die 3 engages the blank 31 positioned upon the die block 2, the waffle is securely held against the plunger 4, which is forced downwardly in the recess 8 as the male die enters the same. Upon retraction of the die 3, the spring 14 causes the plunger 10 to follow the die and eject the completed container from the female die. Any crumbs or particles that may break off from the container during the forming operation are then discharged through the opening 20 by means of gravity. As the die 3 travels upwardly, the arms 28, which embrace the same, will engage the upper edge of the container carried upon the die 3, and gradually strip the container from the die, causing the same to be delivered to any suitable chute or conveyor which delivers the containers from the machine.

While a single set of dies has been disclosed, it is to be understood that in the commercial production of containers with the present apparatus any number of dies may be provided in a gang arrangement, each actuated by an independent cam mounted upon the shaft 25, which may be either manually or power operated.

From the foregoing explanation, considered in connection with the accompanying drawing, it will be readily seen that an extremely simple apparatus has been provided, and a highly improved method employed for producing edible containers formed from a batter containing such ingredients that heretofore required either awkward or hand operations. In this connection particular attention is directed to the fact that the advantages derived by the present invention are due primarily to cooking the waffle prior to forming the same, rather than casting or moulding the product and subsequently cooking the same.

We claim:—

1. An apparatus of the class described comprising, an angularly disposed female die provided with a tapered recess having a flat bottom and a vertical opening in said die communicating with the lowermost portion of said recess for the discharge of particles therefrom, a male die cooperating with the female die to form a container from a pliable blank of dough, means positioned in said recess for automatically ejecting the container therefrom upon retraction of the male die, said ejecting means serving to close said opening when depressed in said die, and yieldable means for subsequently embracing the side walls of the male die to strip the container therefrom.

2. An apparatus of the class described comprising, an angularly disposed female die provided with a tapered recess having a flat bottom and a vertical opening in said die communicating with the lowermost portion of said recess for the discharge of particles therefrom, a male die cooperating with the female die to form a container from a blank, a plunger slidably journaled in said female die and provided with an ejector head positioned within said recess and of substantially the same diameter as the bottom of said recess, said head serving to close said opening when depressed in said recess, and yieldable means for subsequently embracing the side walls of the male die to strip the container therefrom.

3. An apparatus of the class described comprising, an angularly disposed female die provided with a tapered recess having a flat bottom and a vertical opening in said die communicating with the lowermost portion of said recess for the discharge of particles therefrom, a male die cooperating with the female die to form a container from a pliable blank of dough, and means positioned in said recess for automatically ejecting the container therefrom upon retraction of the male die, said ejecting means serving to close said opening when depressed in said die.

4. An apparatus of the class described comprising, an angularly disposed female die provided with a tapered recess having a flat bottom and a vertical opening in said die communicating with the lowermost portion of said recess for the discharge of particles therefrom, a male die cooperating with the female die to form a container from a blank, and a plunger slidably journaled in said female die and provided with an ejector head positioned within said recess and of substantially the same diameter as the bottom of said recess, said head serving to close said opening when depressed in said recess.

CHARLES W. HOWE.
JOHN A. NEVIN.